May 4, 1948.    H. G. FAUCHERRE    2,441,014

DEVICE FOR MANUFACTURING PASTEBOARD CONTAINERS

Original Filed July 30, 1943

Inventor
H. G. Faucherre
By Hancock Downing Seebold
Attys.

Patented May 4, 1948

2,441,014

UNITED STATES PATENT OFFICE 2,441,014

DEVICE FOR MANUFACTURING PASTEBOARD CONTAINERS

Henry Georges Faucherre, Bern, Switzerland, assignor to Neher A. G. (Neher S. A.), a joint-stock company of Switzerland Original application July 30, 1943, Serial No. 496,794. Divided and this application January 22, 1945, Serial No. 573,868. In Switzerland August 13, 1942

2 Claims. (Cl. 93—36.5)

This application is a division of my prior application Serial No. 496,794, filed July 30, 1943.

Object of the invention is a device for manufacturing pasteboard containers.

Even with the most exact manufacture of lid and container body it was, up to date, impossible to make closings of pasteboard on ordinary seaming machines for metal containers. The seamings either always reopened or the formation of them was even impossible. It was necessary to use special devices. Movable ring segments have already been employed, pressing the pasteboard containers against a cylindrical mandrel rotatably mounted on a seaming tool and entering the hole of the lid placed on the container body, whereby the latter and the lid are held fast. These rings segments carry elastic members with a groove, which, on seaming, serve as holding-up pieces for the seaming tool which is rotatable and slidable in axial direction. However, even these special instruments were useless, for the seamings made therewith were not durable in that sufficient adhesion between lid and container body was not obtained, so that the lid was loose and could be turned by hand on the container body.

An object of the present invention is a device for executing a method for manufacturing pasteboard containers, for the execution of which existing metal container seaming machines of a workshop can be used and wherein the lid is impregnated before it is brought on to the container, for, in this case, the lid, on seaming, behaves as a metallic lid.

The device according to the invention has a heated seaming roller for seaming lid and container body together.

The accompanying drawings, by way of example, in

Figure 1:
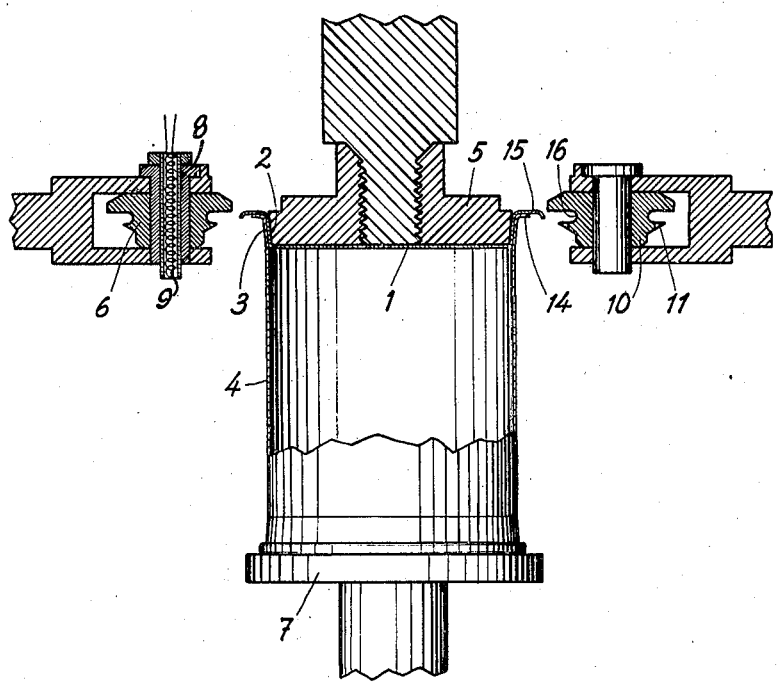
Figure 2:
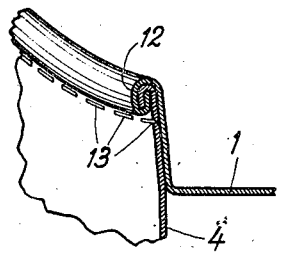

Fig. 1 in a schematic way shows a part of the device,

Fig. 2 a section through a finished closing and

Figure 3:
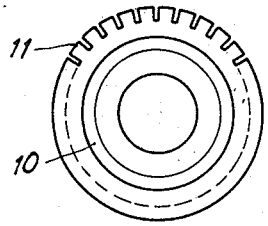

Fig. 3 a side view of the perforating edge of a perforator roller.

A non-illustrated disc of pasteboard is treated either by a thermoplastic or thermohardening impregnation, preferably by one penetrating the whole material. As thermoplastic impregnating means substances of the nitrocellulose base and as thermohardening means resins of the urea base may be used. After having the disc impregnated so that it can be deformed as metal, a lid 1 as shown in Fig. 1 is made of it by means of well-known, preferably heated, non-illustrated tools. This lid 1 has a conical fitting face 2 bearing on a fitting face 3 of the container 4. This latter has a horizontal, annular rim 14 as is the case in metallic boxes. The lid 1, too, has such a horizontal rim 15 slightly bent downwards on its circumference. Lid 1 is now brought on to the container body 4 supported upon the rotatable seaming plate 7 and pressed into the container by means of the seaming head 5 in that the seaming plate 7 is moved upwards. The fitting faces 2 and 3 are manufactured exactly enough to guarantee tight closing even before seaming is carried out, so that, on subsequent rotation of the container, throwing out of contents between lid and container body is impossible. By these conical fitting faces and the impregnation a quality of tightness is obtained which in metal boxes is impossible without a rubber ring. Now, when the lid 1 is in the position shown in Fig. 1, seaming plate 7, head 5 and the container are rotated and the seaming roller 6 being moved towards the rim of the lid rolls the rims 14 and 15, thereby producing a double-folded border as shown in Fig. 2 and as is usual in metal boxes. The device described above for pressing the lid into the container and for seaming the same is one usually employed in seaming machines for metal boxes. The seaming roller 6 is loosely mounted on a hollow bolt 8 in the interior of which a heater 9 is placed. After the seaming operation is completed, the seaming roller 6 is returned from the container and the perforator roller 10 is brought into operating position. This roller 10 has a perforating edge 11 (Fig. 3) which, on rotation of the plate 7, i. e., of the container 4, makes a perforation 13 on the container immediately below the finished seaming 12, but above the exterior surface of the bottom of the lid, which allows of an easy separation of container and lid by means of an ordinary knife or another instrument without any damage to the lid. Therefore, the lid, after its separation, may be repeatedly taken off and put on again, while maintaining the tight closing between the conical fitting faces 2 and 3. The perforating operation is thus carried out after the seaming is finished, therefore, the groove 16 of roller 10 is so deep that its bottom does not strike against the seam. If the perforation were made before inserting the lid or even on making the container body, the container weakened by the perforation might on pressing in the lid or during seaming, easily be damaged.

Lid and container may be provided with a metallic foil, either on the inside or the outside, or both on the inside and the outside.

If for the container body and the lid the same kind of impregnation is used, cohering in the seam is obtained owing to heat supply and pressure, so that reopening of the same is prevented.

The containers may be shaped conically, cylindrically, rectangularly or have any other form. They may be boxes, bottles, etc.

The expression "lid" may also mean the bottom of the container.

The seaming device may, as above said, be a separate seaming machine as used for metal boxes, or may form part of a machine for manufacturing pasteboard containers or of a racking machine.

What I claim is:

1. In a container-closing device for interfolding flanges of a pasteboard cover impregnated for being deformable as metal, and of a pasteboard container body, a rotatable and axially movable plate for receiving said pasteboard container body, a rotatable seaming head for holding said pasteboard cover within said pasteboard container body, a carrier movable towards and away from said seaming head, a hollow bolt mounted on said carrier with its axis outside said seaming head, a folding roller mounted on said bolt in height of said seaming head for interfolding said flanges, and a heating device placed within said hollow bolt for heating said folding roller.

2. In a container-closing device for interfolding flanges of a pasteboard cover impregnated for being deformable as metal, and of a pasteboard container body, a rotatable and axially movable plate for receiving said pasteboard container body, a rotatable seaming head for holding the pasteboard cover within said pasteboard container body, a carrier movable towards and away from said seaming head, a rotatable heated folding roller mounted on said carrier with its axis outside said seaming head but arranged in height of said seaming head for interfolding said flanges, a support movable towards and away from said seaming head, and a perforator roller rotatably mounted on said support in such a position with regard to said folding roller that it makes a perforation on the container body immediately below the seaming made by said folding roller, but above the exterior surface of the bottom of the cover.

HENRY GEORGES FAUCHERRE.

REFERENCES CITED

The following references are of record in the file of this patent:

UNITED STATES PATENTS

| Number | Name | Date |
|---|---|---|
| 2,145,636 | Scharf | Jan. 31, 1939 |
| 2,238,056 | Hothersall | Apr. 15, 1941 |
| 2,250,799 | Harrison | July 29, 1941 |

FOREIGN PATENTS

| Number | Country | Date |
|---|---|---|
| 143,487 | Austria | Nov. 11, 1935 |
| 9,027 | Great Britain | 1912 |